United States Patent [19]

Hart et al.

[11] Patent Number: 4,807,234

[45] Date of Patent: Feb. 21, 1989

[54] PHASE LOCKED ALTERNATING DIELECTRIC RIDGE GAS LASER

[75] Inventors: Richard A. Hart, Wethersfield; Leon A. Newman, South Windsor; Archie D. Heath, Enfield; John T. Kennedy, Meriden, all of Conn.

[73] Assignee: United Technologies Corporation, Hartford, Conn.

[21] Appl. No.: 138,900

[22] Filed: Dec. 28, 1987

[51] Int. Cl.$^4$ ............................................. H01S 3/098
[52] U.S. Cl. ...................................... 372/18; 372/64; 372/82
[58] Field of Search ...................... 372/18, 55, 61, 64, 372/82, 92

[56] References Cited

U.S. PATENT DOCUMENTS

| | | | |
|---|---|---|---|
| 4,373,202 | 2/1983 | Laakmann et al. | 372/64 |
| 4,577,323 | 3/1986 | Newman et al. | 372/64 |
| 4,688,228 | 8/1987 | Newman et al. | 372/18 |

OTHER PUBLICATIONS

L. A. Newman et al; "High Power Coupled $CO_2$ Waveguide Laser Array"; Appl. Phys. Lett. 48(25), Jun. 23, 1986; pp. 1701–1703.

Primary Examiner—William L. Sikes
Assistant Examiner—B. Randolph
Attorney, Agent, or Firm—Peter R. Ruzek

[57] ABSTRACT

A phase-locked ridge waveguide gas laser includes a body having two major and two minor limiting surfaces together circumferentially bounding an internal space within the body, which contains a gaseous lasing medium. The gaseous medium is excited at radio frequency with attendant light emission from the gaseous medium. Mirrors are so positioned relative to the body as to provide lasing of the light emission. Respective ridges partition the internal space into at least three laser resonator cavities each sustaining a guided mode of the lasing light emission. The ridges extend in an alternative fashion from one and the other of the major surfaces of the body into the internal space and terminate short of the respectively other of the major surfaces to provide respective gaps. Each of these gaps connects two adjacent ones of the laser resonator cavities for phase-locking the guided modes in such cavities. However, the alternation of such gaps between the other and the one of the major surfaces provides discrimination against higher-order transverse modes.

4 Claims, 4 Drawing Sheets

PHASE LOCKED ALTERNATING DIELECTRIC RIDGE GAS LASER

The Government has rights in this invention pursuant to a contract awarded by the Department of the Air Force.

DESCRIPTION

1. Technical Field

This invention relates to waveguide lasers and more particularly to $CO_2$ waveguide lasers having an array of phase locked resonators separated from each other by respective ridges.

2. Background Art

The advent of the waveguide gas laser allows the fabrication of more compact lasers. Reducing the dimensions of the passage of the discharge housing provides increased gain, higher power generated per unit volume and improved saturation parameter. This increase in power is achieved even though linear gas waveguides leak radiation into the walls of the dielectric, because of the existence of well defined, low loss modes of laser propagation. The performance enhancements result from favorable de-excitation of the gas by wall collisions, from device operation at increased gas pressure, and from reduction in gas temperature due to the improved thermal conduction provided by the waveguide walls.

In an effort to further increase output power, several improvements have been developed. One device presented by H. R. Schlossberg in U.S. Pat. No. 4,367,554 of Jan. 4, 1983 has increased output power by employing a plurality of hollow dielectric channels within a chamber containing a $CO_2$ gas mixture. The diameter of the individual dielectric channels must be selected such that each channel is incapable of sustaining a guided mode of propagation, and be fabricated with an optically leaky dielectric. Only the multiplicity of leaky channels in combination provides sufficient gain for lasing within a device that comprises the totality of channels.

Another technique which has been used to increase the output power of gas lasers is to provide a mechanism for phase locking one laser relative to another, either by injection locking or by optical coupling techniques. Phase locking maintains spatial coherence between the individual resonators.

Injection locking of adjacent lasers is accomplished by feeding the output of a single laser into a parallel array of optical resonators which act as amplifiers. When the lengths of the different optical paths are adjusted properly, the phase of the output of the amplifiers is constant. Although this technique provides phase locking and increased power, it mandates the use of external optical assemblies, such as mirrors and mounts, all of which must be precisely adjusted and which are subject to environmental degradation.

Another effective technique for providing phase locking is through optical coupling of adjacent lasers. Phase locked operation of adjacent lasers by optical coupling has been demonstrated in both waveguide gas lasers and semiconductor lasers. However, the physics which determine the operation of semiconductor lasers differ substantially from those applicable to waveguide gas lasers. A semiconductor laser is characterized by a guiding region whose index of refraction is greater than that of the surrounding cladding material. On the other hand, a waveguide gas laser possesses a guiding region having an index of refraction much lower than that of the surrounding material.

Optical coupling in the two types of lasers occurs from two entirely different mechanisms. Semiconductor lasers couple as a result of the existence of an evanescent portion of the guided optical field in one resonator that penetrates into another closely proximate resonator. Optical coupling between adjacent waveguide gas lasers cannot be by evanescent field coupling, but can only result from optical radiation loss or "leaks" between adjacent lasers. Consequently, techniques used to optically couple semiconductor lasers have only limited, if any, applicability to waveguide gas lasers.

One type of an optically coupled waveguide gas laser of the prior art comprises an elongated chamber that is divided into a plurality of longitudinal waveguides by partitions made from an optically transmitting dielectric material. Prior art lasers of this type are excited by conventional DC or RF discharge that is provided to each optical resonator. The optically transmissive dielectric provides a lossy boundary through which energy leaks from one resonating cavity to the next, effectively coupling the phases and changing the amplitude distribution of the waveguide modes.

Coupled waveguide gas lasers of this kind provide for increased power and phase locking. However, these devices are expensive to fabricate because of the dielectric array contained within the chamber. In addition, the amount of energy which "leaks" from one cavity to the next is limited to relatively small levels because of the high reflectivity of the transmitting material at the oblique angles of incidence which characterize mode propagation in waveguides. This in turn limits the operating parameters under which stable phase locked operation can be achieved.

Optically transmitting dielectric materials absorb power to some extent and reduce the overall amount of power available to the laser. It is well known in the art that employing a lossy dielectric separation between resonators will favor the "antisymmetric" phase locked normal mode of operation. This mode of operation is undesirable for most applications because the laser output beam possesses a power null across the optic axis. Moreover, the compartmentalized design of these lasers burdens them with poor thermal conductivity and undesirable gas flow characteristics. It is difficult to obtain optically transmitting materials in the infrared that are also good heat conductors for carrying away the heat generated by the electrical power dissipated in the laser's plasma column.

Initiating and sustaining a discharge in the resonator regions is difficult. With either DC or RF excitation, the resonator ridge geometry produces a higher electric field strength within the gap above the ridges than in the resonators. Consequently, coupled ridge waveguide gas lasers of the prior art prevent gas breakdown in the gap and limit the discharge to the resonator regions. The additional apparatus needed to confine the discharge entails using additional components resulting in higher costs.

In quest for increasing the output power of a waveguide gas laser arrangement, it has been proposed in a commonly assigned U.S. Pat. No. 4,688,228, issued Aug. 18, 1987, to arrange a plurality of resonator cavities next to one another, and to separate each adjacent two of such cavities from each other only incompletely by a ridge which extends from one of the major internal surfaces bounding the cross-sectionally rectangular internal space of the laser body toward the other major surface, but which terminates short of such other major surface.

Experience has shown that this waveguide gas laser arrangement operated well with two of such resonator cavities. However, when the number of the resonator cavities that are arranged next to one another was increased to three or more with all of the ridges still extending from one and the same major surface, problems were encountered with the quality of the combined laser beam emerging from the laser arrangement and particularly with phase locking between and among the resonator cavities. Such problems are attributable to the fact that a large open or unguided region exists at one of the major surfaces bounding the internal space subdivided by the ridges into individual resonator cavities. This open region not only permits radiation to leak from one of the resonator cavities to the adjacent one to achieve the desirable phase locking, but also permits the development of higher-order transverse modes. Consequently, a great number of transverse mode beats was observed in laser arrangements having several adjacent resonator cavities connected with one another by such a large open region.

Accordingly, it is a general object of the present invention to avoid the disadvantages of the prior art.

More particularly, it is an object of the present invention to develop a waveguide gas laser arrangement which does not possess the disadvantages of the known arrangements of this type.

Still another object of the present invention is so to construct the arrangement of the type here under consideration as to provide adequate discrimination against higher-order transverse modes.

It is yet another object of the present invention to design the above arrangement in such a manner as to be relatively simple in construction, inexpensive to manufacture, easy to use, and reliable in operation nevertheless.

DISCLOSURE OF THE INVENTION

The above objects and others which will become apparent hereafter are achieved by a phase-locked ridge waveguide gas laser which includes a body having two major and two minor limiting walls together circumferentially bounding an internal space within the body which contains a gaseous lasing medium. Excitation means is disposed on the body and excites the gaseous medium at radio frequency with attendant light emission from the gaseous medium. Light-reflecting means is so positioned relative to the body as to provide lasing of the light emission. Partitioning means partitions the internal space into at least three laser resonator cavities each sustaining a guided mode of the lasing light emission. The partitioning means includes a plurality of ridges which, according to the invention, extend in an alternating fashion from one and the other of the major walls of the body into the internal space and terminate short of the respectively other of the major walls to provide respective gaps. Each of these gaps connects two adjacent ones of the laser resonator cavities. However, since such gaps alternate between the other and the one of the major surfaces, there is obtained discrimination against higher-order transverse modes.

BEST MODE FOR CARRYING OUT THE INVENTION

Figure 1:
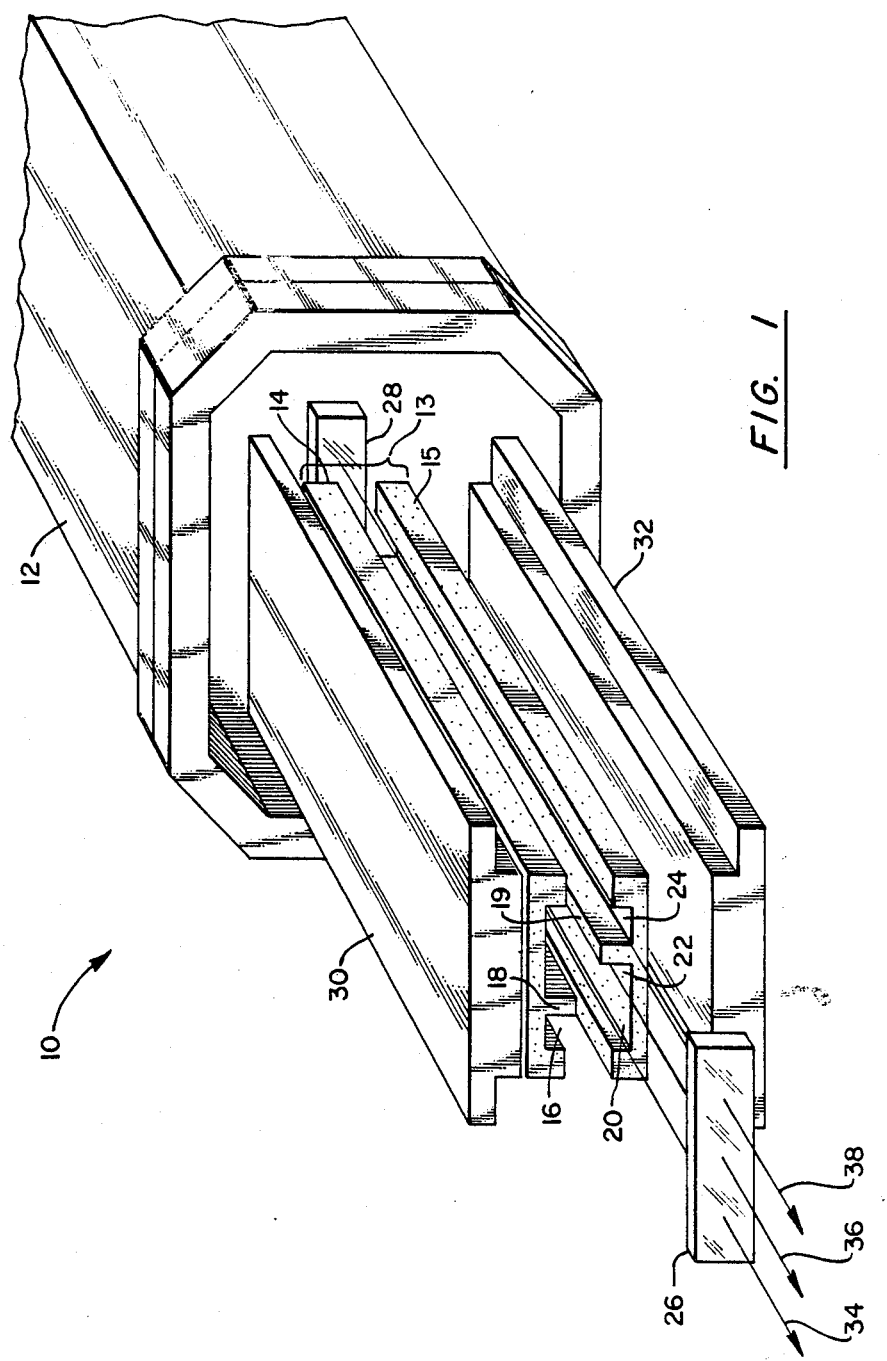
FIG. 1 is an exploded perspective illustration of a phase locked alternating ridge waveguide gas laser provided according to the present invention.

Referring now to FIG. 1, in an exploded perspective illustration of a phase locked alternating ridge waveguide gas laser provided according to the present invention, a phase locked alternating ridge waveguide gas laser 10 comprises a housing 12 made from bakable aluminum or equivalent. The housing 12 contains a dielectric body 13 which consists of two components 14 and 15, and is made from a ceramic material or equivalent. The components 14 and 15 bound an internal space 16 upon assembly of the body 13. The housing 12 also includes end covers and a gas port in the housing (not shown) enabling the device to be evacuated and back filled with a lasing gas that is also not illustrated.

Inside the internal space 16 are longitudinal ridges 18, 19 alternatingly formed on the components 14 and 15 of the body 13 by conventional techniques. These ridges 18 and 19 define three optical resonators 20, 22 and 24 as an example. As hereinafter detailed with respect to FIG. 2, the dimensions of the resonators 20, 22 and 24 must be selected to sustain lasing in a selected mode and to provide optical coupling between the resonators 20, 22 and 24. In the best mode embodiment, the length of the resonators 20, 22 and 24 is approximately 37 cm, although other lengths may be substituted. The dielectric material selected to comprise the components 14 and 15 of the body 13 can be a ceramic material of a type known in the art, such as aluminum oxide ($Al_2O_3$) and in the best mode embodiment comprises beryllium oxide (BeO). Those skilled in the art will note that the ridges 18 and 19 may comprise a different dielectric than the remainders of the components 14 and 15 of the ceramic body 13 and may equivalently be fabricated separately from the body 13 and subsequently positioned in the internal space 16 during assembly.

Mirrors 26 and 28 are located by conventional techniques at either end of the body 13 or within the end covers perpendicular to the resonators 20, 22 and 24. They are made from conventional materials known in the art, such as zinc selenide, and are chosen to be reflective of a selected percentage of incident light at a selected wavelength.

The lasing gas is a conventional mixture, and in the best mode embodiment comprises a mixture of 4% xenon, 12% carbon dioxide, 20% nitrogen and 64% helium by mole fraction at a pressure of 100 Torr. Those skilled in the art will note that other equivalent mixtures and pressures may be equivalently substituted.

Also included are radio frequency electrodes 30 and 32 which are of a conventional type and extend over the entire length of the resonators 20, 22 and 24. In the best mode embodiment the electrodes 30 and 32 comprise copper or aluminum sheet at least 20 $\mu$m thick for excitation at 145 MHz. If other excitation frequencies are substituted, the thickness of the electrodes 30 and 32 must be chosen to be greater than the skin depth. The electrodes 30 and 32 are attached by conventional techniques to the body 13.

When assembled, the housing 12 is evacuated and then filled with the lasing gas. Radio frequency excitation is provided to the RF electrodes 30 and 32 via a conventional RF feedthrough in the housing 12 (not shown) and produces an electrical excitation of the gas. As is well known in the art, proper selection of the optical parameters and gas pressures will result in lasing of the device. Guided mode optical signals 34, 36 and 38 will be produced in each of the resonators 20, 22 and 24.

Although conventional radio frequency excitation may be employed, in the best mode embodiment the radio frequency excitation circuit comprises a distributed inductance parallel resonant radio frequency circuit as presented by Peter Chenausky et al in U.S. Pat. Nos. 4,363,126 and 4,443,877 assigned to the assignee hereof and incorporated by reference herein.

The RF field is developed in the capacitor formed by the body 14 and 15 and the upper and lower RF electrodes 30 and 32. The circuit initiates and sustains an electric excitation in the resonator region of the housing 12. An external shunt inductance is provided to resonate the capacitance of the excitation structure. Conventional 50 ohm impedance RF power supplies can effectively be matched to the transverse excitation impedance load presented by the laser structure. By operating a few megahertz off of the center resonant frequency, a point is reached where the real impedance equals 50 ohms. This is achieved by cancelling the reactive component of the discharge impedance at this frequency with a series reactance that is capacitive for low frequencies and inductive at high frequencies.

A problem develops as the length of the device is scaled and/or the frequency of the RF field is increased. A voltage variation develops along the length of the device because the electrical characteristics of the laser are distributed throughout its length resulting in a nonuniform discharge and reduced output per unit length. For example, at an operating frequency of 145 MHz and a device length of 37 cm, the high dielectric constant parallel electrode geometry will exhibit standing wave phenomena similar to those observed in a lossy transmission line. Analysis has revealed that if a distributed inductance comprising a multiplicity of discrete circuit inductors is used to resonate the laser, the voltage variations are essentially eliminated. In the best mode embodiment the inductors comprise discrete circuit elements (not shown in FIG. 1) connected between the two RF electrodes 30 and 32. The spacing between the inductors should be much less than a quarter of the excitation wavelength to adequately approximate the distributed inductance. In the best mode embodiment the distributed parallel inductance has a magnitude of 10 nanohenrys and is comprised of at least ten coils on each side of the body 13.

The use of a parallel resonant radio frequency circuit as presented by the aforementioned Peter Chenausky et al patents and detailed hereinabove allow the construction of long phase locked ridge waveguide gas lasers operating at high frequencies which can be driven with a very simple single port RF connector.

Figure 2:
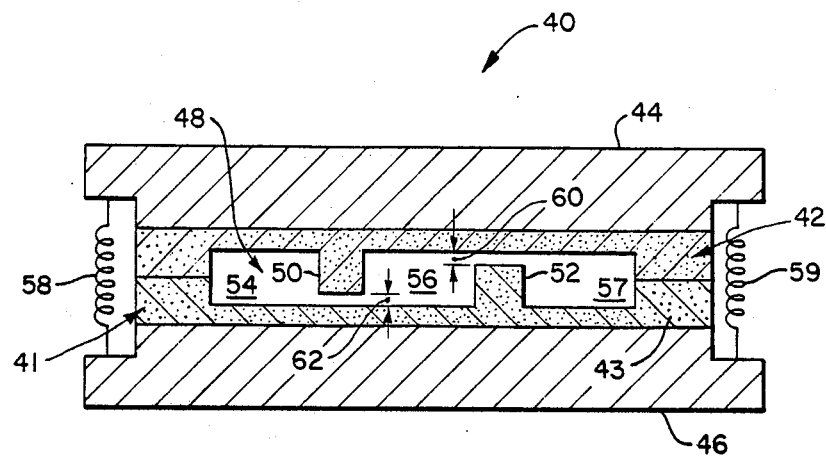
FIG. 2 is a sectioned illustration of a portion of the phase locked alternating ridge waveguide gas laser of FIG. 1.

FIG. 2 is a sectioned illustration of a portion 40 of the phase locked ridge waveguide gas laser of FIG. 1. Dielectric body 41, which consists of components 42 and 43, is bounded by upper RF electrode 44 and lower RF electrode 46. Within internal space 48 are ridges 50 and 52 which form resonators 54, 56 and 57. Each of the ridges 50 and 52 extends into the internal space 48 from a different one of the components 42 and 43. The internal space 48 and the ridges formed in the body 41 are fabricated by techniques well known in the art. Also illustrated are discrete inductor coils 58 and 59 located between the upper and lower RF electrodes 44 and 46 on either side of the body 41. The inductors 58 and 59 comprise part of the distributed inductance parallel resonant circuit described hereinabove with respect to FIG. 1.

Although only two ridges 50 and 52 creating three resonators 54, 56 and 57 are shown, those skilled in the art will note that a greater number of ridges delineating a greater number of resonators may be selected. Such ridges 50 and 52 will then extend into the internal space 48 in an alternating fashion or succession from the components 42 and 43. Moreover, although only a linear array of parallel resonators is illustrated, those skilled in the art will recognize that other geometrical resonator configurations such as cylindrical or opposed linear array of parallel resonators may be similarly chosen.

The height of the ridges 50 and 52 is selected to be less than the depth of the internal space 48 so that there is less than total physical separation between the resonators 54, 56 and 58. A respective gap 60 and 62 exists between the upper component 42 and the ridge 52 and between the lower component 43 and the ridge 50. The gap 60 enables optical energy to leak between the resonators 54 and 56, while the gap 62 enables optical energy to leak between the resonators 56 and 57. The amount of optical coupling between adjacent resonators 54 and 56, and 56 and 57, is controlled by the gap dimension and width of the ridge 50 or 57 which forms the separation between the respective adjacent resonators. In order to increase the amount of coupling between channels, it is desirable to fabricate as small a separation as possible and as large a gap 60 or 62 as possible. The separation is limited by material and fabrication constraints to be approximately ten thousandths of an inch for the rectangular resonator geometry illustrated in FIG. 2. The gap 60 or 62 also allows the parallel electrical excitations in the resonators 54, 56 and 57 to couple to one another, thereby obtaining uniform discharges and good initiation of all discharges within the individual resonators 54, 56 and 57.

In order to operate in the lowest order mode, the gap dimension must be less than or equal to one-half the internal space depth. In the best mode embodiment, the internal space depth is between 0.1 and 0.5 cm. The resonator width is between 0.1 and 0.5 cm, and the gap 60 or 62 is between 0.19 and 0.5 times the internal space depth. Larger gap dimensions would result in multimode operation of the laser. However, the alternating disposition of the gaps 60 and 62 at the components 42 and 43 provides an excellent discrimination against higher-order modes when the ridges 50 and 52 extend more than half-way across the internal space 48, and good discrimination against at least some of such higher-order modes when the ridges 50 and 52 are lower.

For efficient operation of the laser, it is necessary that an RF excitation be created in each of the resonators 54, 56 and 57. When the RF excitation is applied, the field strength between the electrodes 44 and 46 is much higher in the gap region than in the resonator region. Those skilled in the art will note that gas breakdown will first occur within the gap region and will most probably be limited thereto. However, in the phase locked alternating ridge waveguide gas laser provided according to the present invention, the dimensions of the ridges 50 and 52 are selected to create a gap region discharge such that free electrons oscillating therein will make sufficient numbers of ionizing collisions with gas atoms within the resonators 54, 56 and 57 to initiate and sustain a discharge in the resonators 54, 56 and 57 adjacent to the ridge 50 and 52. In the best mode embodiment the ridge 50 and 52 must have a width such that the separation between adjacent resonators 54, 56 and 57 is less than fifty thousandths of an inch, and in the best mode embodiment comprises approximately ten thousandths of an inch.

Figure 3:
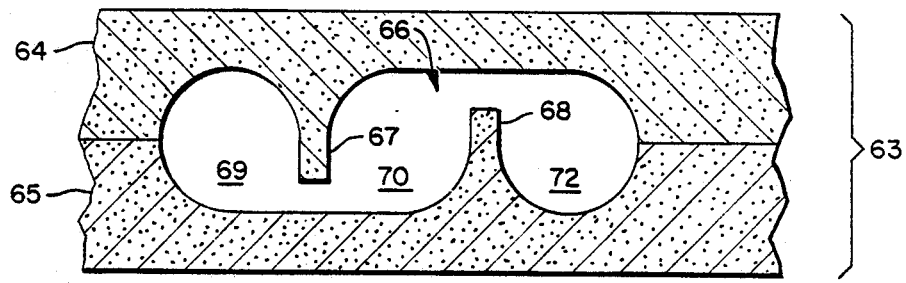
FIG. 3 is a sectioned illustration of a portion of an alternative embodiment of the phase locked ridge alternating waveguide of FIG. 1.

FIG. 3 is a sectioned illustration of a portion 63 of an alternative resonator geometry for the phase locked alternating ridge waveguide laser of FIG. 1. Dielectric body 63 includes two components 64 and 65 and includes an internal space 66 with ridges 67 and 68 fabricated therein. The ridges 67 and 68 extend longitudinally in the internal space 66 to form three substantially O-shaped resonators 69, 70 and 72 having a cross section which approximately comprises a modified double concave geometry at each of the components 64 and 65. Every other aspect thereof is the same as in the phase locked alternating ridge waveguide gas laser described hereinbefore with respect to FIG. 1.

As is well known in the art, the resonator geometry of waveguide gas lasers must be selected to enable guide mode propagation of an optical signal within the guide. According to the present invention, the function of the ridges is to provide a sufficiently lossy boundary between resonators to enable guided mode propagation in the resonators, while providing for as much optical coupling by radiation leakage as possible. Therefore, it is best to minimize the overall dimensions of the ridges themselves. Moreover, smaller ridge geometries allow for more compact laser designs and provide savings in material costs.

Ridges fabricated with rectangular cross sections must possess a certain minimum width or lose their structural integrity. Ceramic materials such as aluminum oxide or beryllium oxide cannot support ridges less than approximately 0.2 mm wide.

A design which provides more compact geometry and ease of fabrication is a U-shaped waveguide as provided by commonly assigned U.S. Pat. No. 4,577,323 entitled U CHANNEL WAVEGUIDE LASER. A U-shaped resonator design mandates a modified double concave ridge cross sectional geometry for a phase locked ridge waveguide gas laser. The double concave ridge geometry as applied in FIG. 3 is of superior strength because thicker walls at the base of the ridges 67 and 68 allow for more narrow ridges to be fabricated. Ridges having a width as thin as 0.25 mm can be fabricated in this manner. As a matter of fact, the guide regions can actually be tangent to each other so that the ridge can actually have zero thickness in the center region between guides.

Figure 4A:
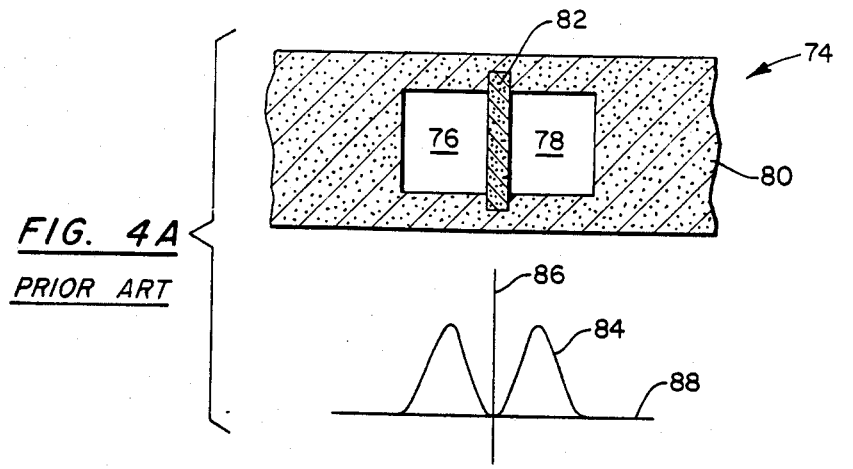
FIG. 4A is a sectioned illustration of a coupled waveguide gas laser of the prior art and a diagram of the intensity distribution of the optical field contained therein.

FIG. 4A illustrates a portion 74 of a coupled waveguide gas laser of the prior art comprising resonators 76 and 78 in ceramic body 80 separated by a dielectric medium 82 which is transparent to the laser radiation, and includes a diagram of the intensity distribution of the optical field therein. The diagram contains curve 84 of the optical intensity and axis 86 indicating intensity magnitude and axis 88 denoting position across the section. Those skilled in the art will note that of the two normal modes that are possible for weakly coupled resonators (symmetric and antisymmetric) only the symmetric mode is shown, as it is the only mode where laser intensities are in phase and at a maximum. Yet, the presence of the dielectric between resonators requires the optical field intensity to diminish to approximately zero therein which favors the selection of the antisymmetric normal mode. Moreover, the loss provided by the dielectric robs the laser of optical power. In addition, it is difficult to obtain dielectrics with good optical transmission and good heat conductivity.

Figure 4B:
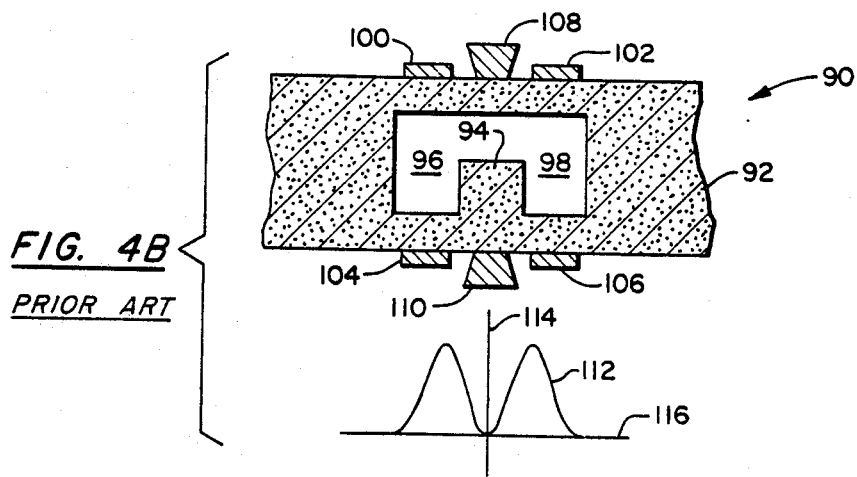
FIG. 4B is a sectioned illustration of a phase coupled ridge waveguide of the prior art and a diagram of the intensity distribution of the optical field contained therein.

FIG. 4B contains a sectioned illustration of a portion 90 of a phase locked ridge waveguide gas laser of the prior art and an intensity diagram of the optical field therein. The laser comprises ceramic body 92 with a ridge 94 fabricated therein forming resonators 96 and 98. Also included are a pair of upper RF electrodes 100, 102 and a pair of lower RF electrodes 104 and 106 as well as permanent magnets 108 and 110. The diagram has curve 112 of optical intensity. Axis 114 indicates the intensity magnitude and axis 116 denotes position across the section.

Removal of some of the dielectric from between the resonators eliminates a source of optical power loss. However, those skilled in the art will note that the lack of dielectric between the resonators would allow the lasing gas to break down in the gap region as well as in the resonators.

Figure 4C:
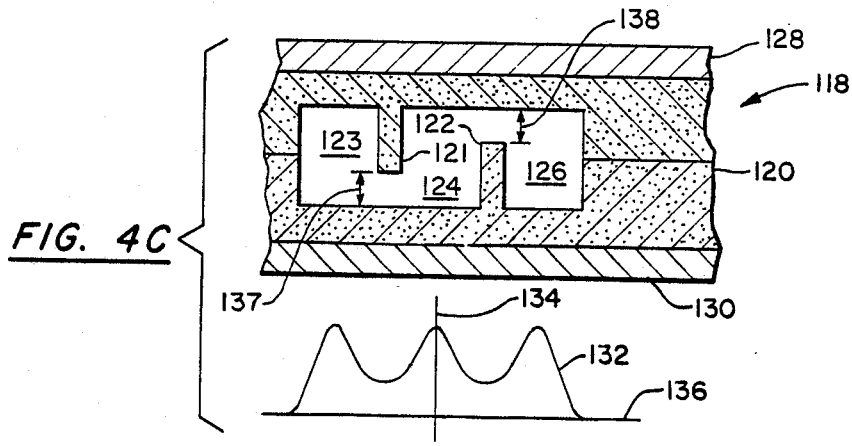
FIG. 4C is a sectioned illustration of a portion of a phase locked alternating ridge waveguide gas laser provided according to the present invention and a diagram of the intensity distribution of the optical field contained therein.

FIG. 4C is a sectioned illustration of a portion 118 of an alternating phase locked ridge waveguide gas laser provided according to the present invention including body 120 having alternating ridges 121 and 122 fabricated therein forming resonators 123, 124 and 126. Also included are upper RF electrode 128, and lower RF electrode 130 and a diagram of the intensity of the optical field contained therein. The diagram, which illustrates the symmetric mode, contains curve 132 of the optical intensity, and axes 134 and 136 denote intensity magnitude and position across the laser section respectively.

Although only the ridges 121 and 122 are illustrated, those skilled in the art will recognize that the representations of the optical field for the double ridge/three resonator configuration can be extended to multiple ridge/resonator configurations. In the best mode embodiment the resonator physical parameters are selected to support only the symmetric mode of operation.

Examination of the intensity diagram of FIG. 4C reveals that the optical field intensity does not drop to zero in the gap region 137 or 138 between the resonators 123, 124 and 126. As described hereinabove, without dielectric material completely separating each resonator 123, 124 or 126, an excitation will be sustained in each of the resonators 123, 124 and 126 as well as in the gap 137 or 138 if the dimensonal parameters of the ridges 121 and 122 are properly selected. Those skilled in the art will note that the presence of the optical discharge in the gap region provides unexpected benefits and is therefore desirable. Besides operating as a source of ionizing electrons for the resonators 123, 124 and 126, the lasing gas located in the gap regions is a source of optical power and contributes to the overall gain of the laser. Moreover, the presence of the lasing gas mixture which acts as the gain medium inhibits the operation of the laser in the less desirable antisymmetric normal mode. The phase locked alternating ridge waveguide ilustrated in FIG. 3 can also be used in the configuration illustrated in FIG. 4C.

Yet, the alternation of the gaps 137 and 138 discriminates against the development of disruptive higher-order transverse modes, as already mentioned before. Comparison tests have been conducted with laser bodies including five adjacent resonators with the separating ridges extending from only one of the components of the body in accordance with prior art, and with the ridges alternating in accordance with the present invention, on the other hand. In the first case, over thirty beat frequencies were observed, distributed between 0 and 140 MHz. In the second case, it was possible to tune the laser in such a manner that only a single beat frequency was observed. This proved the higher-mode discrimination properties of the construction of the present invention.

Figure 5:
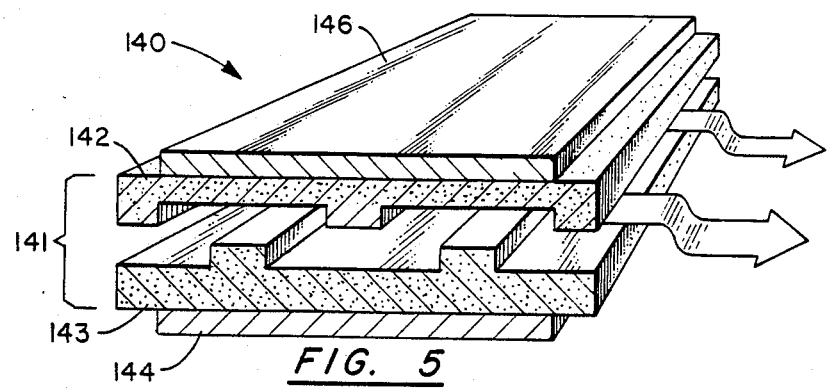
FIG. 5 is an illustration partially in section and partially in perspective of an alternative embodiment of a phase locked alternating ridge waveguide gas laser of FIG. 1.

FIG. 5 is an illustration partially in perspective and partially in section of a portion of an alternative embodiment 140 of a phase locked alternating ridge waveguide gas laser provided according to the present invention. Dielectric body 141 including components 141 and 143 is fabricated such that a large volume of flowing lasing gas can be provided to the internal space in a continuous fashion. The body 141 is bounded by lower a RF electrode 144 and an upper RF electrode 146. This configuration enhances the laser operational capabilities of the laser in very high continuous duty applications and also has the advantage of providing convective cooling by the flowing gas in addition to conductive cooling provided by the ceramic dielectric material forming the ridged waveguides. Moreover, discharge produced gas constituents which may be detrimental to the operation of the laser can be quickly removed. Housing, end covers, mirrors, and radio frequency excitation circuitry which comprise this alternative embodiment have not been illustrated and correspond to those elements described hereinbefore with respect to FIG. 1.

Figure 6:
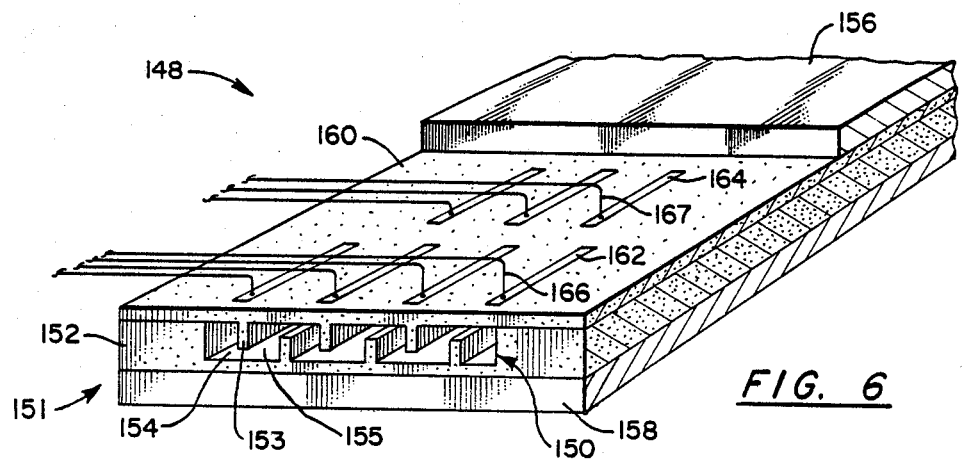
FIG. 6 is an illustration partially in section and partially in perspective of a phase controlled alternating ridge waveguide gas laser provided according to the present invention.

FIG. 6 is an illustration partially in section and partially in perspective of a portion of a phase controlled ridge waveguide gas laser 148 provided according to the present invention. Internal space 150 is formed within ceramic body 151 consisting of components 152 and 160 and has a plurality of alternative ridges which define a plurality of resonators therebetween, of which ridge 153 separating resonators 154 and 155 is an example. Upper RF electrode 156 which extends less than the resonator length provides radio frequency excitation in conjunction with lower electrode 158. The dielectric cover component 160 of the body 151 is positioned on top of the bottom component 152, enclosing the internal space 150. Not shown in FIG. 6 are a metal housing and end covers which enclose the ceramic body 151 and RF electrodes 156 and 158 and are exactly analogous to corresponding metal housing and end covers described with respect to FIG. 1. Unless indicated herein, the materials and structures which comprise the laser described with respect to FIG. 6 are identical to corresponding materials and structures described with respect to FIG. 1.

In addition, for each of the plurality of resonators there exist discrete RF electrodes that are individually responsive to external signals provided thereto, of which electrodes 162 and 164 and corresponding lines 166 and 167 are examples. In the best mode embodiment the discrete RF electrodes comprise copper strips approximately 0.2 cm wide by 2 cm long and 20 $\mu$m in thickness deposited by conventional techniques on the ceramic cover. The additional radio frequency field provided by the supplemental electrodes causes a change in the plasma density of the gas contained in the resonators. Since the plasma density is related to the index of refraction, changing the local plasma density will produce a change in the effective optical path length of each of the resonators.

It is well known in the art that the phase and frequency of oscillation within the resonator is a function of the optical path length. Moreover, optically coupled resonators will phase lock only if all the resonators are within a narrow range of optical path lengths. Substantial variations in the optical path length of the resonators can be traced to several causes, especially environmental parameters such as thermal stresses for the phase controlled alternating ridge waveguide provided according to the present invention. In the best mode embodiment the optical path length difference between resonators should be less than 10% of the lasing wavelength in order to phase lock the guided mode optical signals therefrom.

The discharge intensity modulation provided by the supplemental RF electrodes are responsive to external signals and allow for optical path length compensation to be externally introduced. The phase adjustment provided by the variable optical path of each resonator will ensure phase locked operation of the laser.

Figure 7:
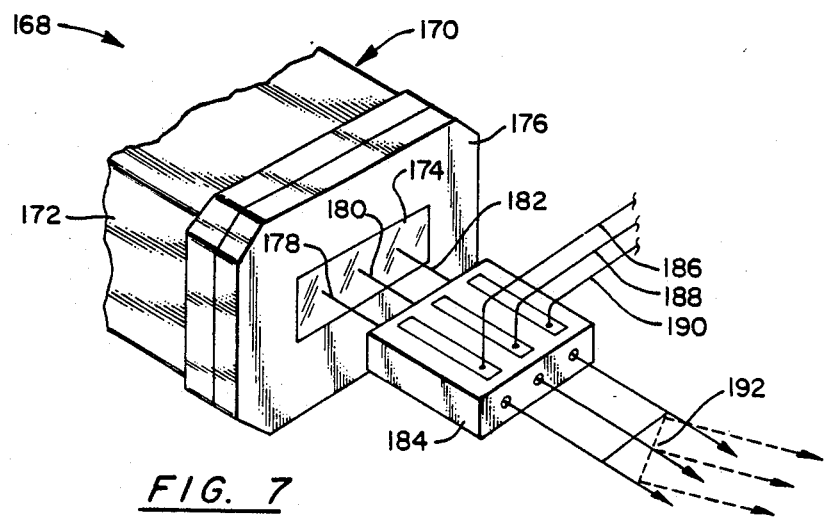
FIG. 7 is a perspective illustration of an alternative ridge waveguide optical phased array gas laser provided according to the present invention.

FIG. 7 is an illustration partially in section and partially in perspective of an alternating ridge waveguide optical phased array gas laser 168 responsive to an external signal that is provided according to the present invention. The alternating ridge waveguide optical phased array comprises phase locked alternating ridge waveguide gas laser 170 including metal housing 172 and mirror 174 mounted within end cover 176. Not illustrated in FIG. 7 is a complementary end port which encloses a ceramic body having longitudinal ridges and RF electrodes that are exactly analogous to corresponding components of a phase locked ridge waveguide gas laser described with respect to FIG. 1.

The output signals of the phase locked alternating ridge waveguide gas laser comprises guided mode optical signals 178, 180 and 182, all having the same phase. These signals are input into extracavity phase modulator 184 which comprises a parallel array of cadmium telluride or equivalent conventional phase modulators, each of which receive a guided mode optical signal.

The phase modulators are responsive to external signals provided on lines 186, 188 and 190 provided by a control signal processor not shown and not part of the present invention. Due to the identical phase of the input guided mode optical signals, a slight perturbation to the optical path length thereof by the phase modulators will result in a tilting or change in direction of the phase front of the phase modulator output signal 192.

Similarly, although the invention has been shown and described with respect to a best mode embodiment thereof, it should be understood by those skilled in the art that various other changes, omissions and additions thereto may be made therein, without departing from the spirit and scope of the invention.

We claim:

1. A phase-locked ridge waveguide laser, comprising:
    a body having a first and a second major wall and two minor walls extending between said major walls, said major and minor walls together circumferentially bounding an internal space within said body;
    a gaseous lasing medium contained in said internal space;
    excitation means disposed on said body for exciting said gaseous medium at radio frequency with attendant light emission from said gaseous medium;
    light-reflecting means positioned relative to said body in such a manner as to provide lasing of said light emission; and
    partitioning means for partitioning said internal space into at least three elongated laser resonator cavities each sustaining a guided mode of the lasing light emission, said partitioning means including a plurality of dielectric ridges connected to and extending in an alternating fashion from said first and from said second major walls of said body into and across said internal space toward the respective other of said first and second major walls and terminating a predetermined distance from said other of said first and second major walls to provide between themselves and the respective other of said first and second major walls respective gaps each of which connects two adjacent ones of said laser resonator cavities for phase-locking said guided modes in such cavities, said gaps being alternatively situated at said second and said first major walls to discriminate against higher-order transverse modes.

2. The gas laser as defined in claim 1, wherein each of said ridges extends more than half-way across the spacing between said major walls.

3. The gas laser as defined in claim 1, wherein said internal cavity and said ridges are substantially rectangular in cross section.

4. The gas laser is defined in claim 1, wherein said major and minor walls and said ridges have such configurations that said resonator cavities are substantially O-shaped in cross section.

* * * * *